(12) United States Patent
Lee et al.

(10) Patent No.: US 12,339,860 B2
(45) Date of Patent: Jun. 24, 2025

(54) KEY-VALUE BASED DATA STORAGE DEVICE AND OPERATION METHOD THEREOF

(71) Applicants: SK hynix Inc., Icheon-si (KR); Sogang University Research and Business Development Foundation, Seoul (KR)

(72) Inventors: Seungjin Lee, Seoul (KR); Changgyu Lee, Seoul (KR); Youngjae Kim, Seoul (KR); Inhyuk Park, Icheon-si (KR); Woo Suk Chung, Icheon-si (KR)

(73) Assignees: SK hynix Inc., Icheon-si (KR); Sogang University Research and Business Development Foundation, Seoul (KR)

( * ) Notice: Subject to any disclaimer, the term of this patent is extended or adjusted under 35 U.S.C. 154(b) by 55 days.

(21) Appl. No.: 18/511,226

(22) Filed: Nov. 16, 2023

(65) Prior Publication Data
US 2024/0370449 A1    Nov. 7, 2024

(30) Foreign Application Priority Data
May 2, 2023 (KR) ........................ 10-2023-0057336

(51) Int. Cl.
*G06F 16/24* (2019.01)
*G06F 3/06* (2006.01)
(Continued)

(52) U.S. Cl.
CPC ........ *G06F 16/2474* (2019.01); *G06F 3/0673* (2013.01); *G06F 3/0679* (2013.01); *G06F 16/2282* (2019.01); *G06F 16/24573* (2019.01)

(58) Field of Classification Search
CPC .. G06F 16/2474; G06F 3/0673; G06F 3/0679; G06F 16/2282; G06F 16/24573;
(Continued)

(56) References Cited

U.S. PATENT DOCUMENTS

| 11,550,504 B2 | 1/2023 | Lee et al. |
| 2019/0034427 A1* | 1/2019 | Trika ................ G06F 16/21 |
| 2024/0086362 A1* | 3/2024 | Wang ................ G06F 16/137 |

FOREIGN PATENT DOCUMENTS

| KR | 10-2018-0030319 A | 3/2018 |
| KR | 10-2020-0053512 A | 5/2020 |

OTHER PUBLICATIONS

Chang-Gyu Lee et al., "iLSM-SSD: An intelligent LSM-tree based key-value SSD for data analytics," 2019 IEEE 27th International Symposium on Modeling, Analysis, and Simulation of Computer and Telecommunication Systems (MASCOTS), IEEE, 2019.

(Continued)

*Primary Examiner* — Tasnima Matin

(57) ABSTRACT

A key-value (KV) based data storage device configured to process one or more range query commands includes a first table, summary data, a Log-Structured merge (LSM) tree area storing a plurality of second tables forming an LSM tree structure, and a value log area storing a value corresponding to a key stored in the LSM tree structure. The summary data includes version data including a global version representing current states of the first table and the plurality of second tables. The KV based storage device adds a copy version of the global version in the version data when initiating processing of a range query command and refers to that copy version while processing that range query command.

16 Claims, 4 Drawing Sheets

(51) Int. Cl.
  *G06F 16/22*    (2019.01)
  *G06F 16/2457*  (2019.01)
  *G06F 16/2458*  (2019.01)

(58) Field of Classification Search
  CPC .... G06F 3/0659; G06F 3/0604; G06F 3/0658; G06F 2212/1016
  See application file for complete search history.

(56) References Cited

OTHER PUBLICATIONS

Sung-Ming Wu et al., "KVSSD: Close integration of LSM trees and flash translation layer for write-efficient KV store," 2018 Design, Automation & Test in Europe Conference & Exhibition (Date 2018), IEEE, 2018, pp. 563-568.
Yanqin Jin et al., "KAML: A flexible, high-performance key-value SSD," 2017 IEEE International Symposium on High Performance Computer Architecture, 2017, pp. 373-384.
Junsu Im et al., "Pink: High-speed in-storage key-value store with bounded tails," 2020 USENIX Annual Technical Conference, Jul. 2020, pp. 173-187.
Donghyun Min et al., "Isolating namespace and performance in key-value SSDs for multi-tenant environments," the 13th ACM Workshop on Hot Topics in Storage and File Systems (HotStorage'21), Jul. 2021, pp. 8-13.
Yangwook Kang et al., "Towards Building A High-performance, Scale-in Key-Value Storage System," the 12th ACM International Conference on Systems and Storage (SYSTOR '19), Jun. 2019, pp. 144-154.
Janki Bhimani et al., "Fine-grained Control of Concurrency within KV-SSDs," the 14th ACM International System and Storage Conference (SYSTOR '21), 2021 Association for Computing Machinery, Jun. 2021.
Yang Seok Ki, "Key-Value SSD Explained—Concept, Device, System, and Standard," Storage Developer Conference, 2017.
Jinhyung Koo et al., "Modernizing file system through in-storage indexing," the 15th USENIX Symposium on Operating Systems Design and Implementation (OSDI '21), USENIX Association, Jul. 2021, pp. 75-92.
Chanwoo Chung et al., "LightStore: Software-defined Network-attached Key-value Drives," the 24th International Conference on Architectural Support for Programming Languages and Operating Systems, ASPLOS '19, Apr. 2019, pp. 939-953.
"Los Alamos National Laboratory and SK hynix to demonstrate first-of-a-kind ordered Key-value Store Computational Storage Device," 2022, Web page: https://discover.lanl.gov/news/0728-storage-device, Demonstration at 2022 Flash Memory Summit in Santa Clara.
"Key Value Storage API Specification," SNIA Technical Position, Sep. 28, 2020, Web page: https://www.snia.org/keyvalue.
"Nvm express key value command set specification," NVM Express, Oct. 2022, Web page: https://nvmexpress.org/developers/nvme-specification/.
Wenshao Zhong et al., "REMIX: Efficient range query for Ism-trees," the 19th USENIX Conference on File and Storage Technologies (FAST '21), USENIX Association, Feb. 2021, pp. 51-64.
Zhichao Cao et al., "Characterizing, modeling, and benchmarking rocksdb key-value workloads at facebook," the 18th USENIX Conference on File and Storage Technologies (FAST '20), Feb. 2020, pp. 209-223.
Berk Atikoglu et al., "Workload analysis of a large-scale key-value store," the 12th ACM Sigmetrics/Performance joint international conference on Measurement and Modeling of Computer Systems, Association for Computing Machinery, 2012, pp. 53-64.
Brian F. Cooper et al., "Benchmarking cloud serving systems with YCSB," the 1st ACM Symposium on Cloud Computing, 2010, pp. 143-154.
Patrick O'Neil et al., "The Log-Structured Merge-Tree (LSM-tree)," Acta Informatica, 1996, pp. 351-385, vol. 33.
Cristian Zambelli et al., "Phase change and magnetic memories for solid-state drive applications," the IEEE, Sep. 2017, pp. 1790-1811, vol. 105, No. 9.
Jaewook Kwak et al., "Cosmos+ OpenSSD: Rapid prototype for flash storage systems," ACM Transaction on Storage, Jul. 2020, vol. 16, No. 3.
"Samsung NVMe SSD 980 Pro," Web page: https://semiconductor.samsung.com/consumer-storage/internal-ssd/980pro/, 2021.
"Kingston KC3000 PCIe 4.0 NVMe M.2 SSD," Web page: https://www.anandtech.com/show/17029/kingston-kc3000-pcie-40-nvme-flagship-ssd-hits-retail/, 2021.
"A persistent key-value store for fast storage environments," RocksDB, Web page: http://rocksdb.org, 2021.
"Leveldb," github, 2017, Web page: https://github.com/google/leveldb.
Avinash Lakshman et al., "Cassandra: A decentralized structured storage system," SIGOPS Oper. Syst. Rev., 2010, pp. 35-40, vol. 44, No. 2.
Fay Chang et al., "Bigtable: A Distributed Storage System for Structured Data," the USENIX Symposium on Operating Systems Design and Implementation, OSDI 2006, 2006.
Chen Luo et al., "LSM-based storage techniques: a survey," The VLDB Journal, 2020, pp. 393-418, vol. 29, No. 1.
Lanyue Lu et al., "WiscKey: Separating keys from values in SSD-conscious storage," the USENIX Conference on File and Storage Technologies, (FAST '16), 2016.
Manoj P. Saha et al., "KV-SSD: What is it good for?", the 58th ACM/IEEE Design Automation Conference (DAC), 2021, pp. 1105-1110.
"Benchmark Tool," github, Web page: https://github.com/facebook/rocksdb/wiki/Benchmarking-tools, 2021.
Tyler Harter et al., "Analysis of HDFS under HBase: A facebook messages case study," the 12th USENIX Conference on File and Storage Technologies (FAST '14), Feb. 2014, pp. 199-212.
"Rocksdb v7.2.2 release," 2022, Web page: https://github.com/facebook/rocksdb/releases/tag/v7.2.2.

* cited by examiner

KEY-VALUE BASED DATA STORAGE DEVICE AND OPERATION METHOD THEREOF

CROSS-REFERENCE TO RELATED APPLICATION

The present application claims priority under 35 U.S.C. § 119 (a) to Korean Patent Application No. 10-2023-0057336, filed on May 2, 2023, which is incorporated herein by reference in its entirety.

BACKGROUND

1. Technical Field

Various embodiments generally relate to a key-value based data storage device and an operation method thereof, and more particularly, to a key-value based data storage device configured to process a range query command using summary data and an operation method thereof.

2. Related Art

A key-value based data storage device is a type of data storage device that processes values using keys, and performs write, get, delete, and scan operations.

A range query is an operation that is frequently used in database operations and performs an operation of reading a number of values corresponding to a certain key range.

A key-value based data storage device using a Log-structured Merge (LSM) tree structure manages Sorted String Tables (SSTables) using a summary table.

A conventional key-value based data storage device based on a NAND flash memory can execute a PUT or DELETE command while processing a range query command. In this case, a compaction operation may be performed, which may cause a change in the LSM tree structure.

Since a conventional key-value based data storage device cannot manage a summary table in preparation for such a situation, it may be impossible to complete a range query command before a compaction operation is performed.

SUMMARY

In accordance with an embodiment of the present disclosure, a key-value based data storage device may include a first memory storing a first table and a summary data; a second memory including a Log-Structured merge (LSM) tree area storing a plurality of second tables forming an LSM tree structure and a value log area storing a value corresponding to a key; and a controller configured to process a range query command, wherein the summary data includes version data including a global version representing current states of the first table and the plurality of second tables, and wherein the controller adds a copy version of the global version in the version data at the beginning of a processing of the range query command and refers to the copy version while processing the range query command.

In accordance with an embodiment of the present disclosure, an operation method of a key-value based data storage device including a first table, a summary data, a Log-structured merge (LSM) tree area including a plurality of second tables forming an LSM tree structure, and a value log area, the method may include adding a global version representing current states of the first table and the plurality of second tables in version data in the summary data; adding a copy version corresponding to a copy of the global version in the version data when processing the range query command is initiated; referring to the copy version while processing a range query command; and deleting the copy version in the version data in response to processing of the range query command being completed.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate various embodiments, and explain various principles and advantages of those embodiments.

DETAILED DESCRIPTION

The following detailed description references the accompanying figures in describing illustrative embodiments consistent with this disclosure. The embodiments are provided for illustrative purposes and are not exhaustive. Additional embodiments not explicitly illustrated or described are possible. Further, modifications can be made to presented embodiments within the scope of teachings of the present disclosure. The detailed description is not meant to limit this disclosure. Rather, the scope of the present disclosure is defined in accordance with claims and equivalents thereof. Also, throughout the specification, reference to "an embodiment" or the like is not necessarily to only one embodiment, and different references to any such phrase are not necessarily to the same embodiment(s).

Hereinafter, an embodiment will be described taking a key-value (KV) based solid state drive (SSD) as an example. The KV SSD manages keys using a Log-structured merge (LSM) tree stored in an LSM tree area and stores values corresponding to the keys in a value log area separate from the LSM tree area.

Since the KV SSD itself, which manages keys using an LSM tree structure and stores values in a separate value log area, is well known by prior articles such as Lee, Chang-Gyu, et al. "iLSM-SSD: An intelligent LSM-tree based key-value SSD for data analytics." 2019 IEEE 27th International Symposium on Modeling, Analysis, and Simulation of Computer and Telecommunication Systems (MASCOTS). IEEE, 2019, detailed descriptions of the KV SSD will be omitted.

Figure 1:
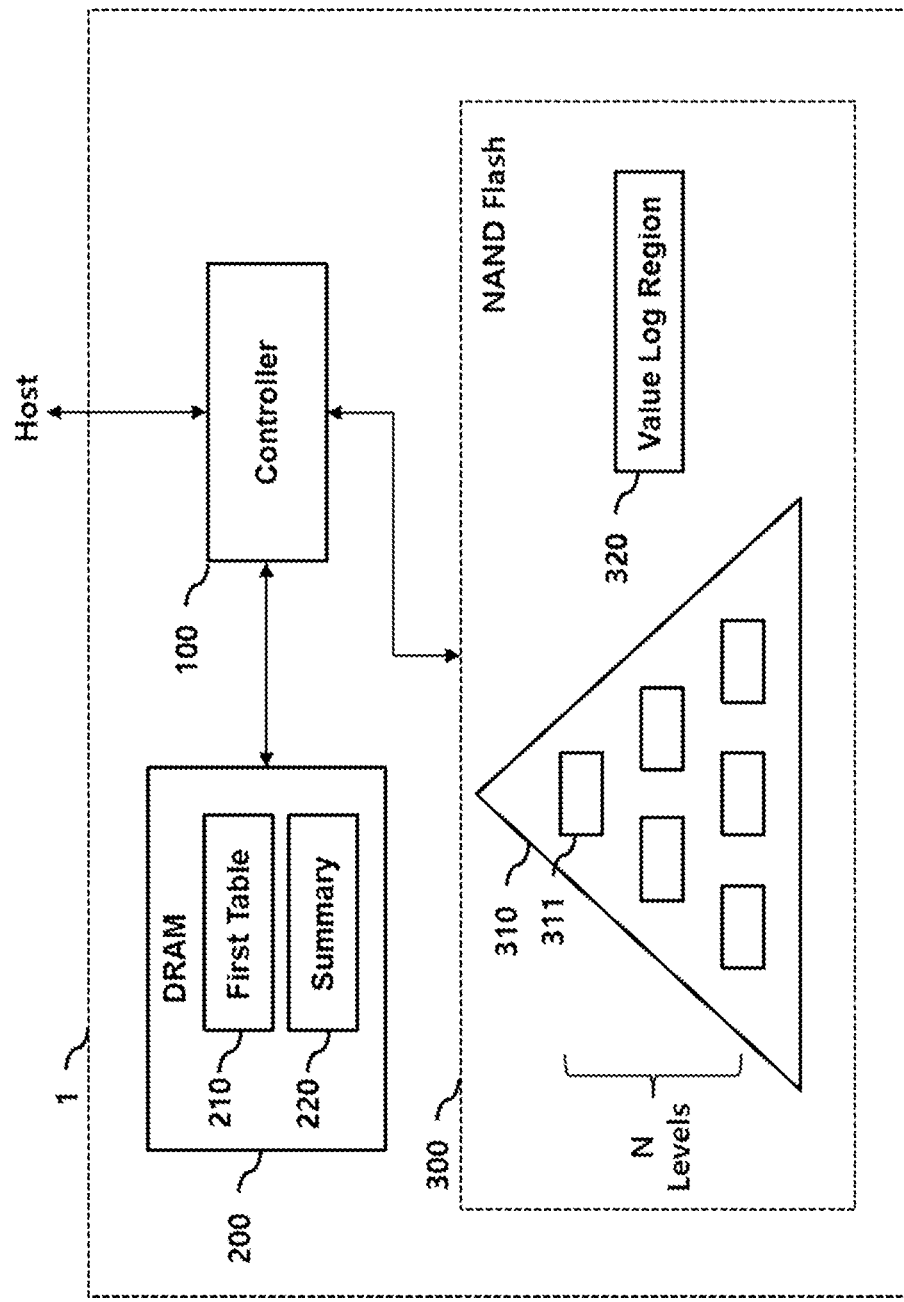
FIG. 1 illustrates a key-value based data storage device according to an embodiment of the present disclosure.

FIG. 1 is a block diagram showing a KV SSD 1 according to an embodiment of the present disclosure.

The KV SSD 1 includes a controller 100, a dynamic random access memory (DRAM) 200, and a NAND flash memory 300.

The controller 100 may perform a read operation, a write operation, or an erase operation in response to receiving a command provided from a host. Since these operations are well-known as disclosed in the aforementioned prior article, repetitive descriptions thereof will be omitted.

In addition, the controller 100 according to the present disclosure processes a range query command and performs a management operation of summary data during the process.

The controller 100 controls the DRAM 200 and the NAND flash memory 300 while processing a range query command.

The DRAM 200 stores a first table 210 and summary data 220. The first table 210 may be represented as a MemTable. The structure and management process of the summary data 220 according to the present disclosure will be described in detail below.

The NAND flash memory 300 includes an LSM tree area 310 for storing keys and a value log area 320 for storing values corresponding to the keys.

The LSM tree area 310 includes a plurality of second tables 311, and the plurality of second tables are arranged in a tree structure having N levels, where N is a natural number. Each second table may be represented as an SSTable.

A second table stores a plurality of keys and offsets corresponding thereto.

The value log area 320 is an area for storing a value corresponding to a key, and an address of the value corresponding to the key may be calculated using an offset and a base address corresponding to the key.

Figure 2:
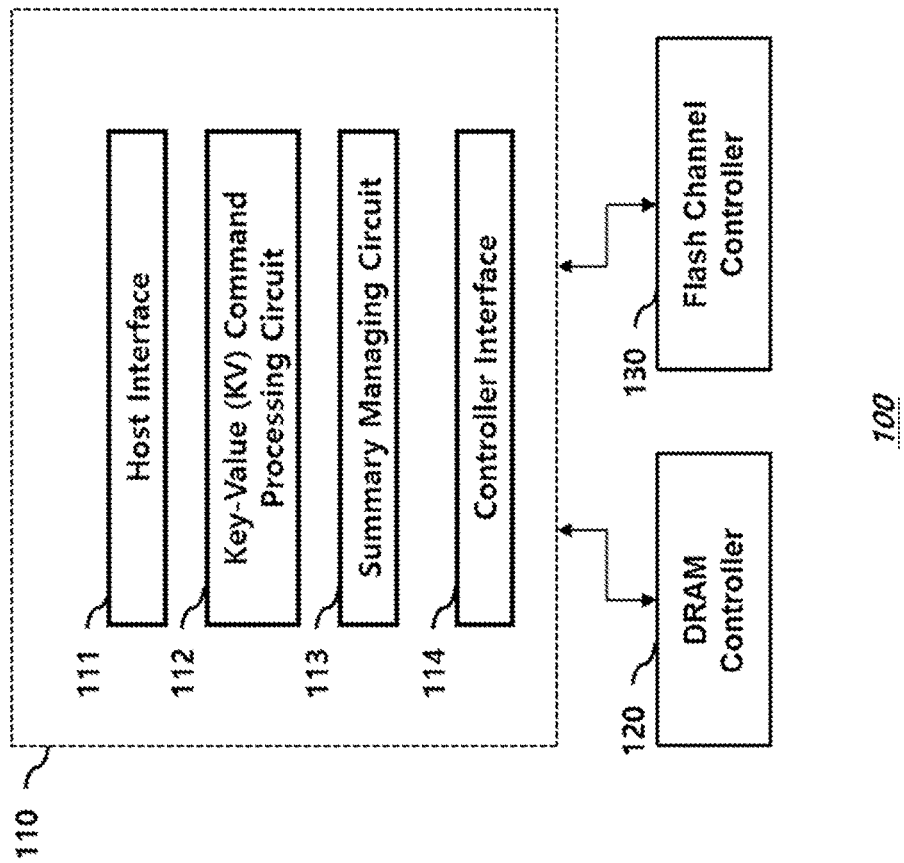
FIG. 2 illustrates a controller according to an embodiment of the present disclosure.

FIG. 2 is a block diagram showing a controller 100 according to an embodiment of the present disclosure.

The controller 100 includes a control circuit 110, a DRAM controller 120, and a flash channel controller 130.

The control circuit 110 interprets a range query command provided by the host and outputs a plurality of values corresponding to a plurality of keys included in a designated range according to the interpretation.

The control circuit 110 may be implemented with hardware, software, or a combination of hardware and software.

The DRAM controller 120 controls read and/or write operations of the DRAM 200 according to a control of the control circuit 110.

The flash channel controller 130 controls read, write, and/or erase operations of the NAND flash memory 300 under the control of the control circuit 110.

In the illustrated embodiment, the flash channel controller 130 individually controls one or more channels, and a plurality of flash memories are connected to each channel.

Since the DRAM controller 120 and the flash channel controller 130 are conventional technology, a detailed description thereof will be omitted.

The control circuit 110 includes a host interface 111, a KV command processing circuit 112, a summary data managing circuit 113, and a controller interface 114. While the embodiment illustrated in FIG. 2 shows separate circuits for interfacing to the host, KV command processing, and summary data managing, embodiments are not limited thereto, and in an embodiment functions of any two or more of the components shown for the control circuit 110 may be performed by a single circuit.

The host interface 111 extracts a KV command from a request sent from the host.

For example, the host may send a request including a KV command according to the Non-Volatile Memory Express (NVMe) protocol and the host interface 111 extracts the KV command from the request transmitted from the host according to the NVMe protocol.

The KV command processing circuit 112 can process KV commands, such as PUT, GET, and DELETE, which are well known in the prior art.

Also, in this embodiment, the KV command processing circuit 112 processes a KV command by controlling the controller interface 114 according to a range query command.

The range query command is for an operation to read data corresponding to a key belonging to a designated range, and while a process for performing the range query command is presented in the present disclosure, embodiments are not limited to a specific one.

For example, a range query command may include a first command for finding a start key of a range and a plurality of second commands for sequentially reading data corresponding to a next key in the range after the start key. The first command may be referred to as the seek command or SEEK, and the second command may be referred to as a next command or NEXT. The range query command may be finished by a next command with a flag indicating a last command or a separate last command explicitly called by an application.

In this embodiment, it is assumed that a range query command operates in a manner of outputting data corresponding to a given range of keys at the time when the range query command starts to be processed.

That is, even if data is updated by another KV command before the processing of the range query command is completed, output corresponding to the range query must correspond to data before the update.

The DRAM 200 shown in FIG. 1 stores summary data 220, which stores information on all second tables stored in the LSM tree area 310.

The KV command processing circuit 112 may find a key included in a given range by referring to the summary data 220 while processing the range query command.

As is well known in the art, the LSM tree structure used in the KV based data storage device is changed in response to KV commands (such as PUT and DELETE) or compaction operations being processed.

The summary data managing circuit 113 manages the summary data 220 while processing the range query command.

The summary data managing circuit 113 manages the summary data so that the range query command can be correctly processed even if the LSM tree structure is changed while the range query command is being processed.

Figure 3:
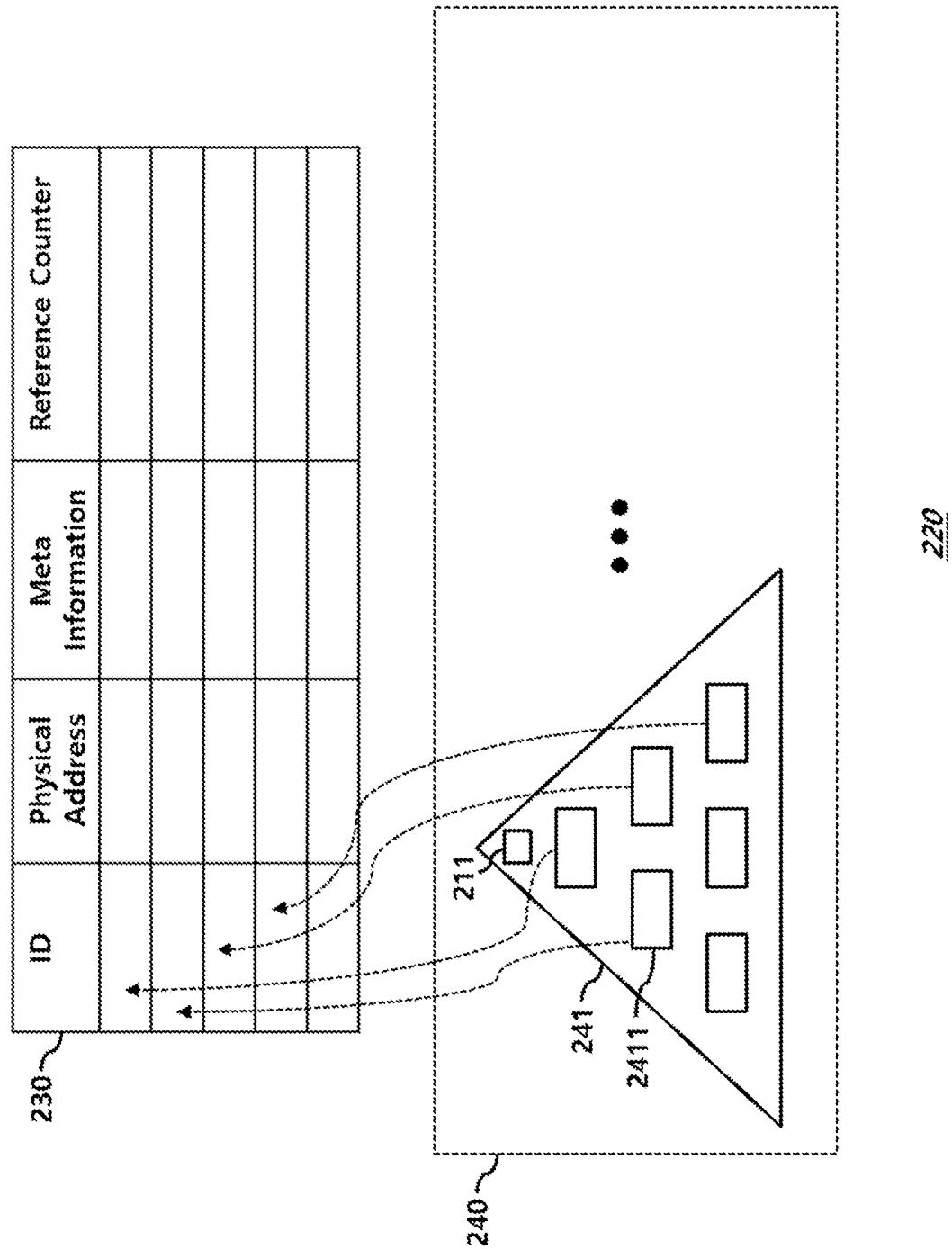
FIG. 3 illustrates the structure of summary data according to an embodiment of the present disclosure.

FIG. 3 is an explanatory diagram showing the structure of the summary data 220 according to an embodiment of the present disclosure.

The summary data 220 includes a metadata pool 230 and version data 240.

In this embodiment, the metadata pool 230 stores information on all the second tables included in the LSM tree area 310 in the form of a table, but the data structure is not limited thereto.

In this embodiment, each entry in the metadata pool 230 includes an ID field, a physical address field, a meta information field, and a reference counter field.

The ID field stores an ID corresponding to a row number in the metadata pool 230. In another embodiment, the entries in the metadata pool 230 may note include an ID field, and instead the ID for an entry in the metadata pool 230 may be determined according to the location of the entry in the metadata pool 230.

The physical address field stores a physical address where a second table corresponding to an entry is located in the LSM tree area 310.

The meta information field stores meta information including various information about the corresponding second table. For example, the meta information may include a level at which the corresponding second table is located in the LSM tree area 310, an ID of a second table located at the upper level, an ID of a second table located at a lower level, information on a plurality of keys stored in the corresponding second table, or combinations thereof.

The reference counter field stores a reference counter indicating a number of KV commands referencing the corresponding second table.

The summary data managing circuit 113 adds or deletes a corresponding row to the metadata pool 230 when, as a result of processing a KV command or a compaction operation, a new second table is created in the LSM tree area 310 or an existing second table is deleted in the LSM tree area 310.

When a second table is added or deleted in the LSM tree area 310, those skilled in the art would understand how to modify the information of the corresponding row for the table and one or more rows neighboring the corresponding row in the metadata pool 230 to conform to the changed LSM tree structure.

When a second table is deleted from the LSM tree area 310, whether a corresponding row is deleted or not from the metadata pool 230 is determined considering a value of the reference counter of the corresponding row, which will be disclosed in detail below.

The version data 240 includes one or more LSM tree versions 241.

An LSM tree version 241 includes information on the first table and information on a plurality of second tables included in the LSM tree at the time of version creation.

Accordingly, the LSM tree version 241 includes first table information 211 and a plurality of second table information 2411.

The first table information 211 is duplicated information of the first table 210 at the time of version creation.

Each second table information 2411 stores information about a corresponding second table.

In one embodiment, the second table information 2411 may store the physical address and meta information of the corresponding second table as they are. In this case, the metadata pool 230 may be omitted because it is redundant information.

However, in such an embodiment, a plurality of LSM tree versions 241 are generated. In this case, the size of the summary data 220 may increase due to duplicated data.

In the embodiment illustrated in FIG. 3, a pointer to a corresponding second table may be stored as second table information 2411. For example, an ID, which is a row number, for the row including the information for the corresponding second table in the metadata pool 230 may be stored as a pointer.

This method is advantageous in that the size of the summary data 220 can be reduced when a plurality of LSM tree versions 241 exist.

In this embodiment, the LSM tree version 241 includes a global version reflecting the latest information of the LSM tree area 310 and a copy version replicating the global version at a specific time.

There is only one global version and it is updated whenever a change occurs in the LSM tree structure. One or more copy versions can exist.

In this embodiment, the summary data managing circuit 113 creates a copy version of the global version when a range query command is executed.

Figure 4:
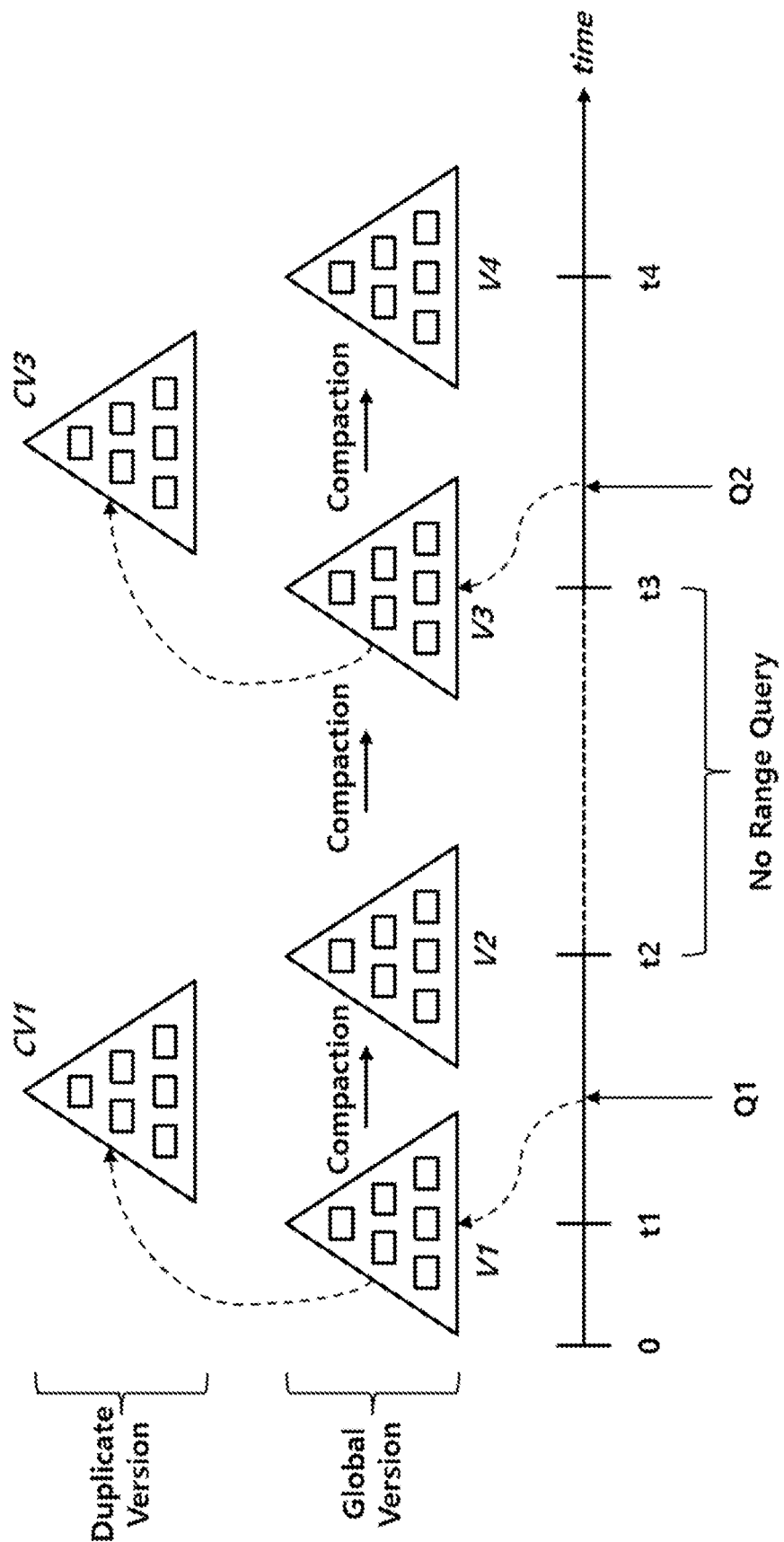
FIG. 4 illustrates a process for managing version data according to an embodiment of the present disclosure.

FIG. 4 is an explanatory diagram explaining a method of managing the version data 240.

As described above, the summary data managing circuit 113 updates the global version to reflect the latest information in the LSM tree area 310.

In the following, the global version at t1 is referred to as a first global version V1, the global version at t2 is referred to as a second global version V2, the global version at t3 is referred to as a third global version V3, and the global version at t4 is referred to as a fourth global version V4.

For example, if a compaction operation is performed between t1 and t2, the LSM tree structure changes and the summary data managing circuit 113 update the global version as the second version global V2 at t2.

Similarly, when the compaction operation is performed between t2 and t3, the LSM tree structure changes and the summary data managing circuit 113 updates the global version to the third global version V3 at t3, and when the compaction operation is performed between t3 and t4, the LSM tree structure changes and the summary data managing circuit 113 updates the global version to the fourth global version V4 at t4.

In this embodiment, a copy version is created when a range query command is executed. In an embodiment, a subsequent range query may use the most recently-created copy version if the global version has not changed since that copy version was created and that copy version still exists.

For example, if the first range query command Q1 is executed before a compaction operation is performed between t1 and t2, the summary data managing circuit 113 adds a first copy version CV1 obtained by copying the first global version V1, which is the global version at that time, to the version data 240.

The KV command processing circuit 112 processes the first range query command Q1 based on the first copy version CV1 even if the global version is changed while the first range query command Q1 is being processed.

The summary data managing circuit 113 deletes the first copy version CV1 when processing of the first range query command Q1 is completed. In an embodiment wherein a subsequent range query command may use the first copy version CV1 if the global version has not changed since the first copy version CV1 was created, the summary data managing circuit 113 may delay deletion of the first copy version CV1, such as by waiting until a command that might change the global version is received before deleting the first copy version CV1. In an embodiment that supports a plurality of range query commands being executed after t1 and before the compaction operation is performed at t2, each of the plurality of range query commands may use the first copy version CV1, and the first copy version CV1 may be deleted only when the processing of all of the plurality of range query commands is completed.

Similarly, if the second area query command Q2 is executed before the compaction operation is performed between t3 and t4, the summary data managing circuit 113 copies the third global version V3, which is the global version at that time, and adds a third copy version CV3 to the version data 240.

The KV command processing circuit 112 processes the second range query command Q2 based on the third copy version CV3 even if the global version is changed during processing of the second range query command Q2.

The summary data managing circuit 113 deletes the third copy version CV3 when processing of the second range query command Q2 is completed.

The summary data managing circuit 113 sets reference counters of all rows in the metadata pool 230 to 1 when the global version is first created.

The summary data managing circuit 113 adjusts reference counters of all rows in the metadata pool 230 when updating the global version.

For example, a reference counter corresponding to a second table merged and deleted by the compaction operation is decreased by 1, a reference counter corresponding to an existing second table maintains its value, and a reference counter of a newly created second table is set to 1.

When a copy version is created, the summary data managing circuit 113 increases a reference counter of a row corresponding to a second table existing in the copy version in the metadata pool 230 by 1, and when a copy version is deleted, the reference counter of a row corresponding to a second table existing in the copy version in the metadata pool 230 is decreased by 1.

As described above, in this embodiment, the summary data managing circuit 113 must refer to a reference counter when determining whether to delete a corresponding row from the metadata pool 230, where the row corresponds to a second table deleted from the LSM tree area 310.

For example, assume that a second table is deleted after being merged by a compaction operation, and that as a result a second table existing in the first global version V1 is deleted from the LSM tree area 310 and a row corresponding thereto is deleted from the metadata pool 230 as well.

Under these assumptions, if a row corresponding to a second table existing in the first global version V1 is deleted from the metadata pool 320, the first range query command Q1 being processed based on the first copy version CV1 may not be normally processed because a value referred by a pointer has been deleted.

Accordingly, before deleting a second table from the metadata pool 230, the summary data managing circuit 113 must determine whether a copy version using the second table exists.

As described above, the reference counter corresponding to any one second table increases by 1 when a copy version using the corresponding second table information is created and decreases by 1 when a copy version using the corresponding second table information is deleted.

That is, even if a second table is deleted from the LSM tree area 310, the reference counter of the corresponding row may be maintained as 1 or more if a range query command referring to the corresponding second table information is being executed.

Therefore, if a reference counter corresponding to a deleted second table is greater than 0, the summary data managing circuit 113 should maintain a row corresponding to the deleted second table in the metadata pool 230.

When updating the reference counter of the metadata pool 230, the summary data managing circuit 113 may delete a corresponding row when a corresponding reference counter becomes 0.

The summary data managing circuit 113 may monitor a reference counter of the metadata pool 230 at regular intervals and delete a row having a reference counter of 0 from the metadata pool 230.

Although various embodiments have been illustrated and described, various changes and modifications may be made to the described embodiments without departing from the spirit and scope of the invention as defined by the following claims. For example, in embodiments, the circuits described herein may include one or more processors and non-transient computer-readable media, and some operations described herein may be performed by the processors executing computer programming instructions stored on the non-transient computer-readable media.

What is claimed is:

1. A key-value (KV) based data storage device comprising:
   a first memory storing a first table and a summary data;
   a second memory including a Log-Structured merge (LSM) tree area storing a plurality of second tables forming an LSM tree structure and a value log area storing a value corresponding to a key; and
   a controller configured to process a range query command,
   wherein the summary data includes version data including a global version representing current states of the first table and the plurality of second tables, and
   wherein the controller adds a copy version of the global version in the version data at the beginning of a processing of the range query command and refers to the copy version while processing the range query command.

2. The KV based data storage device of claim 1, wherein the controller deletes the copy version in the version data in response to processing of the range query command being completed.

3. The KV based data storage device of claim 1, wherein the global version includes first table information corresponding to the first table and a plurality of second table information corresponding to the plurality of second tables, and each second table information includes an address of a corresponding second table and key range information.

4. The KV based data storage device of claim 1, wherein the summary data further includes a metadata pool including a plurality of second table information corresponding to the plurality of second tables, and
   wherein the global version includes pointer information to second table information included in the metadata pool corresponding to the plurality of second tables.

5. The KV based data storage device of claim 4, wherein each of the plurality of second table information includes a reference counter, and wherein the control circuit increases reference counters in the plurality of second table information related to a corresponding copy version in response to processing of the range query command being initiated, and decreases reference counters in the plurality of second table information related to the corresponding copy version in response to processing of the range query command being completed.

6. The KV based data storage device of claim 5, wherein when a second table is deleted in the LSM tree area, the control circuit determines whether corresponding second table information in the metadata pool should be deleted by referring to a reference counter of the corresponding second table information.

7. The KV based data storage device of claim 6, wherein the control circuit adds a plurality of second table information corresponding to a plurality of second tables included in the LSM tree area in the metadata pool when creating the global version and sets reference counters included in the plurality of second table information as 1.

8. The KV based data storage device of claim 7, wherein the control circuit sets a reference counter of corresponding second table information as 1 and adds the corresponding second table information in the metadata pool in response to a second table being added in the LSM tree area, and the control circuit decreases a reference counter of corresponding second table information by 1 in the metadata pool in response to a second table being deleted in the LSM tree area.

9. The KV based data storage device of claim 8, wherein the control circuit deletes second table information in the metadata pool when a reference counter corresponding to the second table information is 0.

10. An operation method of a key-value (KV) based data storage device including a first table, summary data, a Log-structured merge (LSM) tree area including a plurality of second tables forming an LSM tree structure, and a value log area, the method comprising:
adding a global version representing current states of the first table and the plurality of second tables in version data in the summary data;
adding a copy version corresponding to a copy of the global version in the version data when processing of a range query command is initiated;
referring to the copy version while processing the range query command; and
deleting the copy version in the version data in response to processing of the range query command being completed.

11. The operation method of the claim 10, wherein the summary data further incudes a metadata pool including a plurality of second table information corresponding to the plurality of second tables, and
wherein the global version includes pointer information to second table information included in the metadata pool and corresponding to the plurality of second tables.

12. The operation method of the claim 11, wherein the plurality of second table information include a plurality of reference counters, respectively,
wherein adding the global version in the version data includes increasing reference counters in a plurality of second table information related to the copy version, and
wherein deleting the copy version in the version data includes decreasing reference counters in the plurality of second table information related to the copy version.

13. The operation method of the claim 12, further comprising determining whether second table information should be deleted with reference to a reference counter of the second table information in the metadata pool in response to a corresponding second table being deleted in the LSM tree area.

14. The operation method of the claim 13, wherein adding the global version in the version data includes adding a plurality of second table information corresponding to a plurality of second tables stored in the LSM tree area in the metadata pool and setting reference counters in the plurality of second table information as 1.

15. The operation method of the claim 14, further comprising adding second table information in the metadata pool by setting a corresponding reference counter as 1 when adding a corresponding second table in the LSM tree area, and decreasing a reference counter of second table information by 1 in the metadata pool when deleting a corresponding second table in the LSM tree area.

16. The operation method of the claim 15, further comprising deleting second table information in the metadata pool when a corresponding reference counter is 0.

* * * * *